US007119797B2

(12) United States Patent
Kawano et al.

(10) Patent No.: US 7,119,797 B2
(45) Date of Patent: Oct. 10, 2006

(54) INFORMATION PROCESSING APPARATUS, PROGRAM AND COORDINATE INPUT METHOD

(75) Inventors: Seiichi Kawano, Kanagawa-ken (JP); Masayoshi Nakano, Machida (JP); Yuhko Ohmori, Sagamihara (JP)

(73) Assignee: Lenovo Pte. Ltd., Singapore (SG)

( * ) Notice: Subject to any disclaimer, the term of this patent is extended or adjusted under 35 U.S.C. 154(b) by 272 days.

(21) Appl. No.: 10/300,274

(22) Filed: Nov. 20, 2002

(65) Prior Publication Data

US 2003/0098871 A1 May 29, 2003

(30) Foreign Application Priority Data

Nov. 27, 2001 (JP) ............................. 2001-360256

(51) Int. Cl.
*G09G 5/00* (2006.01)

(52) U.S. Cl. .................................. 345/173; 178/18.01

(58) Field of Classification Search ........ 345/173–178; 178/18.01, 18.03, 20.01; D14/389
See application file for complete search history.

(56) References Cited

U.S. PATENT DOCUMENTS

| 4,730,186 | A | * | 3/1988 | Koga et al. ................. 345/179 |
| 4,954,967 | A | * | 9/1990 | Takahashi .................... 345/173 |
| 5,781,181 | A | * | 7/1998 | Yanai et al. ................. 345/173 |
| 5,943,043 | A | * | 8/1999 | Furuhata et al. ............ 345/173 |
| 6,278,443 | B1 | * | 8/2001 | Amro et al. ................. 345/173 |
| 6,657,615 | B1 | * | 12/2003 | Harada ........................ 345/173 |
| 6,707,449 | B1 | * | 3/2004 | Hinckley et al. ........... 345/173 |
| 6,757,002 | B1 | * | 6/2004 | Oross et al. ................. 715/864 |
| 6,943,778 | B1 | * | 9/2005 | Astala et al. ................ 345/173 |
| 2005/0088423 | A1 | * | 4/2005 | Keely et al. ................. 345/173 |

* cited by examiner

*Primary Examiner*—Bipin Shalwala
*Assistant Examiner*—Tom Sheng
(74) *Attorney, Agent, or Firm*—Sawyer Law Group LLP

(57) ABSTRACT

Units are provided for determining whether or not a coordinate input is continued as being substantially the same coordinate and a predetermined time period has lapsed after an initial input of an arbitrary coordinate by a coordinate input unit. A first processing unit performs a first processing in accordance with the coordinate when the determination is not met, and a second processing unit performs a second processing different from the first processing when the determination is met.

18 Claims, 8 Drawing Sheets

| System | Input coordinates when touching on plural points | Resolution | Other features |
|---|---|---|---|
| Matrix | Dependent on controller | Low | Calibration unnecessary, strong to flaw |
| Optical scan | Dependent on controller | Low | Calibration unnecessary, strong to flaw |
| Capacitive coupling | Middle point | High | Only touch, special pen required, strong to flaw |
| Surface acoustic wave | Dependent on controller | High | Only touch, special pen required, strong to flaw |

INFORMATION PROCESSING APPARATUS, PROGRAM AND COORDINATE INPUT METHOD

FIELD AND BACKGROUND OF THE INVENTION

The present invention relates to an information processing apparatus for performing a processing based on an input coordinate, a program for enabling a computer to perform the processing based on the input coordinate, and a coordinate input method of inputting a coordinate for the information processing apparatus to perform the processing based on the input coordinate.

Generally, the touch panel allows for the operations equivalent to the left button click, double click and drag of a mouse. These are the basic operations of a pointing device. In recent years, the pointing devices having a function of scrolling a window or displaying in greater scale a portion where the pointer is located or a screen have been developed, including a third button of a track point or a wheel of an intelligent mouse or a wheel mouse. Generally, however, the touch panel allows for the above basic operations mainly, but has no scroll function or greater scale display function.

In Japanese Published Unexamined Patent Application No. 11-327433, there is disclosed an apparatus for displaying an image by scrolling the screen so that a touch position is located in the center of the screen, if there is the touch, enlarging the image after scroll, if the touch is continued for a predetermined time or more, the enlargement being stopped if the touch position is moved, changing the display of image so that the touch position is located in the center of the screen, if the movement of the touch position is ceased, and further enlarging the displayed image, if the touch is continued.

However, with this technique, while the touch position is being moved, the enlargement of image is stopped, the movement of image is not made, and the displayed image is not changed at all. Therefore, the operator feels that an operation is inconsistent with an image change for the operation, and may be often confused about the operation. Also, the display is not changed at all while the touch position is being moved. Therefore, the operator can only acquire a small amount of information from the screen.

SUMMARY OF THE INVENTION

The present invention has been achieved in the light of the above-mentioned problems associated with the prior art, and it is a purpose of the invention to provide a technique for efficiently offering the operator the information of image display in which an operation is consistent with an image display in scrolling or displaying in greater scale the image in an information processing apparatus, employing coordinate input means capable of inputting a coordinate corresponding to a touched position by contact.

In order to attain the above purpose, according to the present invention, there is provided an information processing apparatus including coordinate input means for periodically receiving an input of a coordinate corresponding to a touched position during the input operation, means for determining whether or not the input coordinates are substantially the same and a predetermined time period has lapsed from an initial input of the coordinate by the coordinate input means, first processing means for performing a first processing in accordance with the coordinate when the determination is not met, and second processing means for performing a second processing different from the first processing when the determination is met. In the second processing, there is provided means for displaying an image in response to an input coordinate periodically received by the input means if input operation has been continued since the lapse of the predetermined time period.

According to the invention, there is provided a program for enabling a computer to function as means for determining whether or not the coordinate input is continued as being substantially the same coordinate and a predetermined time period has lapsed after an initial input of an arbitrary coordinate by coordinate input means for periodically receiving an input of the coordinate corresponding to a touched position during the input operation, first processing means for performing a first processing in accordance with the coordinate when the determination is not met, and second processing means for performing a second processing different from the first processing when the determination is met. The second processing comprises displaying an image periodically changed in correspondence to a periodical change of an input coordinate, if the coordinate input by the coordinate input means is continued after the lapse of the predetermined time period.

According to the invention, a coordinate input method comprises first to third steps. A first step involves performing a touch for inputting a coordinate, before the lapse of a predetermined time period, by coordinate input means for periodically receiving an input of the coordinate corresponding to a touched position during the input operation to enable an information processing apparatus to perform a first processing. A second step involves performing a touch for inputting a coordinate by the coordinate input means, until a predetermined period has lapsed, to enable the information processing apparatus to perform a second processing different from the first processing. A third step involves periodically performing an input of a coordinate by the coordinate input means to enable the information processing apparatus to perform the second processing comprising displaying an image periodically changed in correspondence to a periodical change of the input coordinate, following the second step. The information processing apparatus in accordance with the invention is employed.

In this invention, the category of information processing apparatus includes various types of computers, such as a desktop personal computer, a notebook personal computer, a mobile computer, and a workstation. The coordinate input means may be a touch panel, a tablet, or a touch pad. The coordinate input means may input the coordinate of only one point or the coordinates of a plurality of points at the same time. The touch position detecting method in the coordinate input means may be realized by the pressure sensitive (resistance membrane) method, digital (matrix) method, optical (infrared) scan method, capacitive coupling method, or surface acoustic wave method.

In the invention, the "substantially same coordinate" in the information processing apparatus and the program and the "one coordinate" in the coordinate input method include the coordinate in a range where the input coordinate is shifted, because the touched position is slightly changed even if the operator thinks to touch the same position. Specifically, these coordinates may fall within the circle of a radius of 0.5 mm centered at the input coordinate touched at the initial time. In the invention, the value of "predetermined time period" is set to an appropriate value for the reliable and rapid operation. If the predetermined time period is too short, a misoperation is likely to occur, or if it is too long, the rapid operation can not be made, whereby it is set to 0.5 to 1 sec. Also, the "any coordinate" means a coordinate in the input range or a plurality of coordinates input at the same time. The first processing may be a left button click of mouse, for example.

In this configuration, the coordinate input of a coordinate by the touch on the coordinate input means is started, and if the same point continues to be touched, the substantially same coordinate is periodically input. If the touch is released before the lapse of the predetermined time period from the initial input, the input of the same coordinate is stopped before the lapse of the predetermined time period. Therefore, the determination means determines that the condition is not met, whereby the first processing is performed. On the other hand, if the touch is continued until the predetermined time period has lapsed from the initial input, the substantially same coordinate is periodically input until the predetermined time period has lapsed. Therefore, the determining means determines that the condition is met, whereby the second processing is performed. The second processing involves displaying an image periodically changed in response to a periodical change of an input coordinate so long as the input operation of any coordinate is continued. Accordingly, if the input coordinate is different from the previous input coordinate, the image display is changed each time. Therefore, the change of the image display is not stopped while the input coordinate is changed, whereby the image display is periodically changed in response to an input coordinate periodically changed. Thereby, the operator feels that the operation is consistent with the image display, and efficiently accepts the information by the image display.

In the second processing, the "periodical change of input coordinate" is the periodical change from the substantially same input coordinate as at the initial input of the coordinate. In this case, the periodically changed image display is made by scrolling the image in a direction corresponding to the change of the input coordinate. Thereby, by performing a simple operation of keeping the touch on the same position for a predetermined time period, and then sliding the touched position in a desired direction, the display image can be scrolled in the desired direction.

Another example of the "periodical change of input coordinate" is the periodical change from a new input coordinate different from the substantially same input coordinate as at the initial input of the coordinate. In this case, the periodically changed image display is made by scrolling the image in a direction corresponding to the change of the input coordinate. Thereby, by performing a simple operation of keeping the touch on the same position for a predetermined time period, then touching another position while the touch is continued and sliding the another touched position in a desired direction, the display image can be scrolled in the desired direction. In this case, the image display process in the second processing is performed continuously, so long as the same position continues to be touched, whereby the image can be scrolled any times by repeating the slide operation.

In the second processing, the "periodically changed image display" may include a predetermined pointer that is initiated from the time when the predetermined time period has lapsed. Thereby, the operator can easily recognize the time for initiating the input operation to make the "periodically changed image display" by transferring to the second processing.

In the case where the "periodically changed input coordinate" in the second processing is periodically changed from the substantially same input coordinate as at the initial input of the coordinate, an example of the periodically changed image display is the display in greater scale while being moved in correspondence to the periodically changed input coordinate in an area having a certain positional relation with the periodically changed input coordinate. Thereby, by performing a simple operation of keeping the touch on the same position for a predetermined time period, and sliding the touched position along a portion to be displayed in greater scale, the desired portion of display image can be displayed in greater scale. In this case, the periodically changed image is preferably displayed in greater scale such that the periodically changed input coordinate is always located at an end portion or outside of a display area. Thereby, it is possible to prevent the enlarged display portion from being intercepted by the operator's hands.

The operator may appropriately set or change the content of the periodically changed image display by selecting the scroll display or enlarged display.

BRIEF DESCRIPTION OF DRAWINGS

Some of the purposes of the invention having been stated, others will appear as the description proceeds, when taken in connection with the accompanying drawings, in which.

DETAILED DESCRIPTION OF INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

Figure 1:
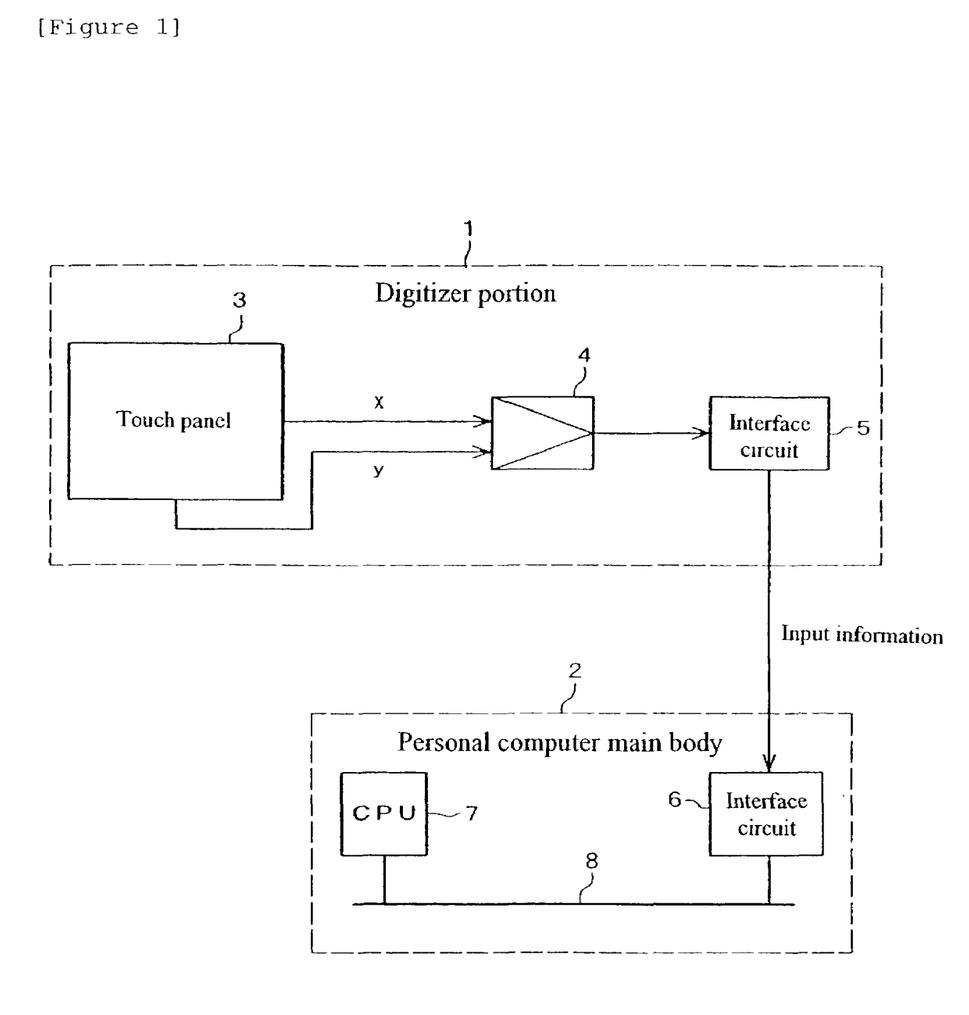
FIG. 1 is a block diagram showing a configuration of an information processing apparatus according to one embodiment of the present invention.

FIG. 1 is a block diagram showing a configuration of an information processing apparatus according to one embodiment of the present invention. As shown in FIG. 1, this apparatus comprises a digitizer portion 1 for accepting a coordinate input by contact and outputting the input information including the input coordinate and the information as to whether or not to be touched (contact is on or off), and a personal computer main body 2 for performing the processing in accordance with the input information. The digitizer portion 1 comprises a touch panel 3 for outputting an analog signal (voltage value) x and y corresponding to X coordinate and Y coordinate of a point touched by a finger or a pen, an AD converter 4 for converting this analog signal into a digital signal, and an interface circuit 5 for converting the input information into a signal conforming to the serial interface standards such as RS232 or USB that can be directly treated by the personal computer main body 2 in accordance with an output of the AD converter 4.

The personal computer main body 5 comprises an interface circuit 6 composed of a USB controller and an I/O controller, and a bus 8 for connecting the interface circuit 6 and the CPU 7, and accepts the input information from the interface circuit 5 via the interface circuit 6 and performs appropriate processings in accordance with the input information. The touch panel 3 is overlapped on a display screen of the personal computer main body 2, and allows the coordinate input corresponding to a display on the screen by touching on the touch panel 3.

Figure 2:
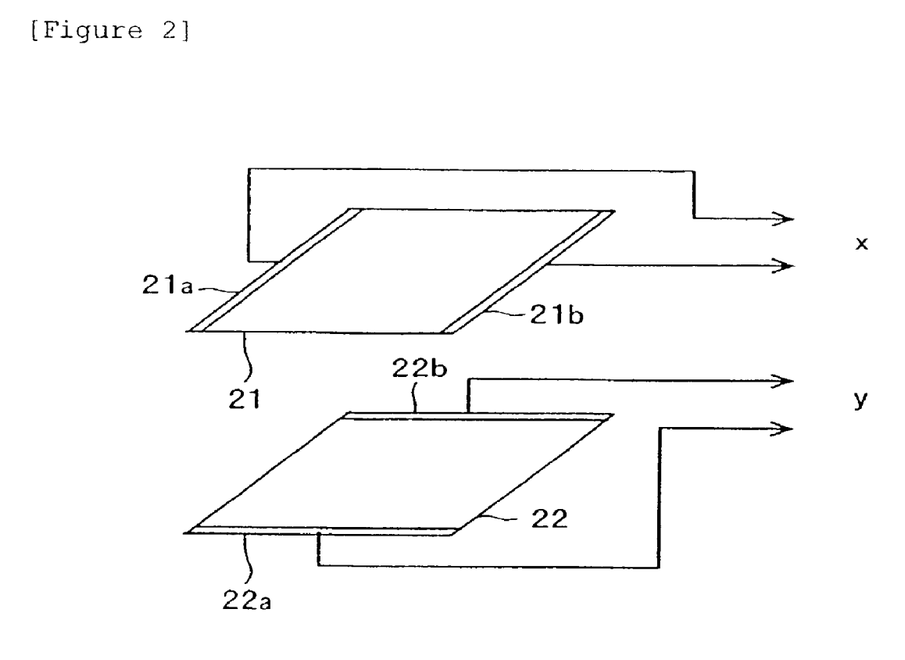
FIG. 2 is an explanatory view for explaining a principle of a touch panel in the information processing apparatus of FIG. 1.

FIG. 2 is an explanatory view for explaining a principle of the touch panel 3. The touch panel 3 is a pressure sensitive (resistance membrane) touch panel having two sheets of transparent electrode (resistance membrane) 21 and 22, as shown in FIG. 2. The transparent electrodes 21 and 22 are opposed with a void, and do not conduct when there is no contact, but if a transparent electrode 21 is touched by a finger or a pen, the transparent electrode 21 connects to a transparent electrode 22 at a touched point, so that both electrodes are placed in a conducting state. At this time, a voltage between the Y-direction ends 22a and 22b of the transparent electrode 22 can be output as a signal y corresponding to a touched position in the Y-direction by applying a constant voltage between the X-direction ends 21a and 21b of the transparent electrode 21. Also, a voltage between the X-direction ends 21a and 21b of the transparent electrode 21 can be output as a signal x corresponding to a touched position in the X-direction by applying a constant voltage between the Y-direction ends 22a and 22b of the transparent electrode 22.

When two points are touched at the same time, an intermediate voltage between the voltages produced when two points are touched separately is produced across the X-direction ends 21a and 21b, and across the Y-direction ends 22a and 22b, whereby signals x and y are output as a level corresponding to a middle point of two points touched. Accordingly, the coordinate of each point can not be input, but only one middle point is input, even if two points are touched at the same time. However, the output signals x and y are analog quantities that vary continuously, corresponding to the touched position, with a high resolution of the touched position.

The digitizer portion 1 outputs the input information including the information regarding the input coordinate from the touch panel 3 obtained in the above way, and the information as to whether the touch panel 3 is touched (on) or not (off), to the personal computer main body 2 from the initial time of contact till the time when the contact is released. The personal computer main body 2 can know the touched condition at present, and the input coordinate, if touched, in accordance with the input information successively input.

Figure 3:
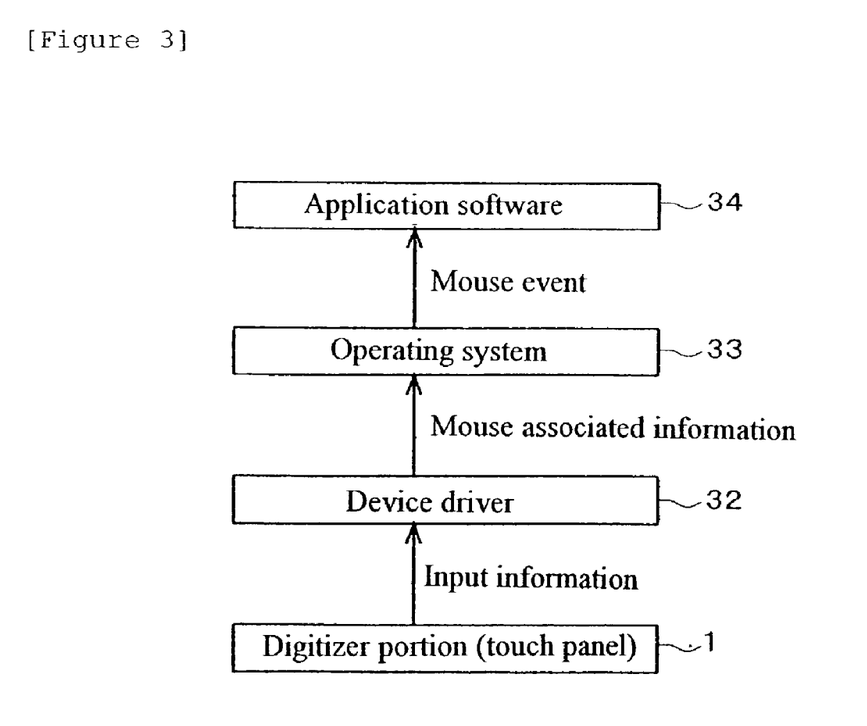
FIG. 3 is a flowchart showing an information flow in the information processing apparatus of FIG. 1.

The OS (Operating System) of the personal computer main body 2 has a device driver for enabling access to the digitizer portion 1. As shown in FIG. 3, the input information from the digitizer portion 1 is converted into the information corresponding to an operation of the mouse by the device driver 32, and passed to the OS 33. In accordance with this information, the OS 33 passes a mouse event indicating the movement of mouse cursor or click to an application software 34.

Figure 4:
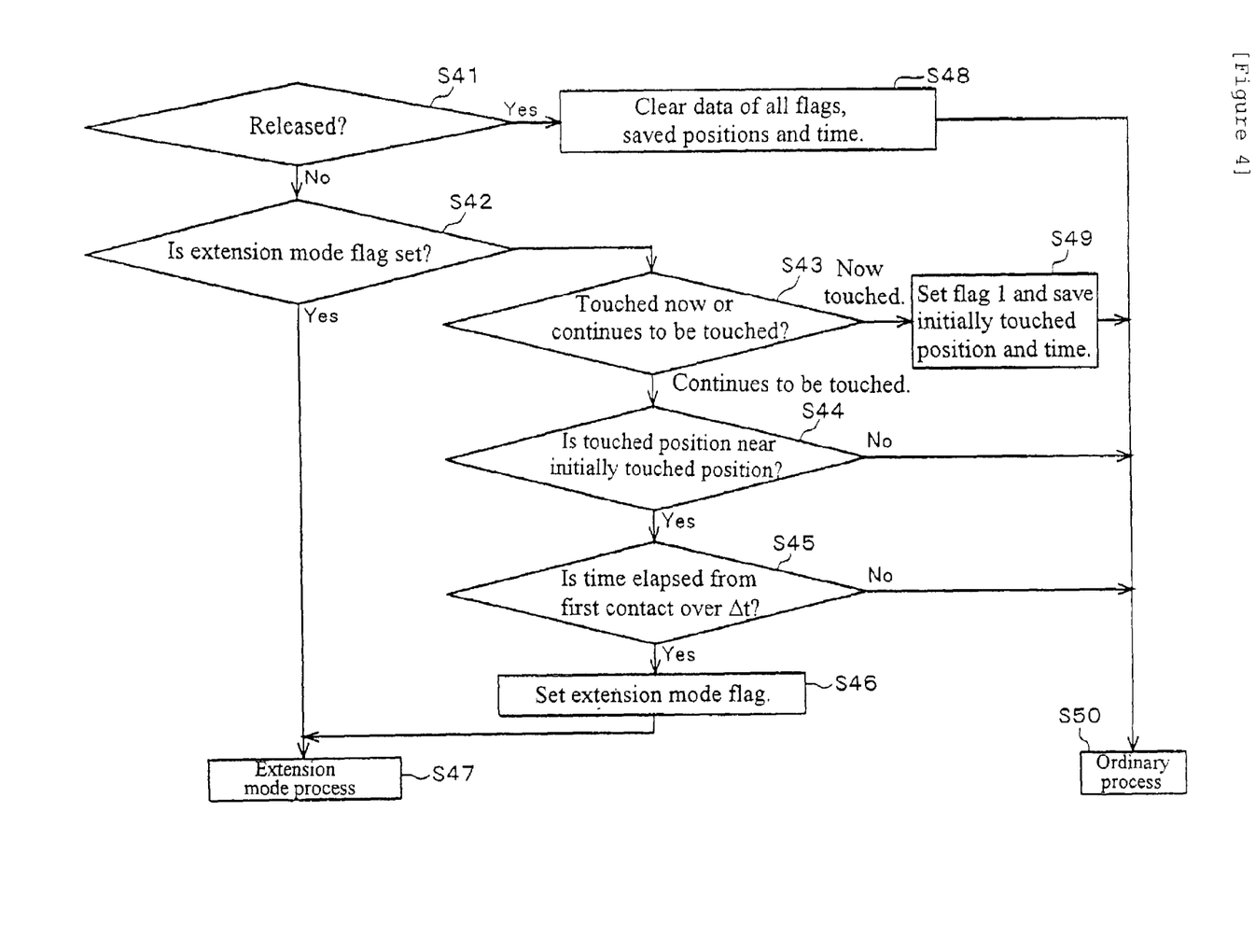
FIG. 4 is a flowchart showing a processing procedure of a device driver in the information processing apparatus of FIG. 1.

FIG. 4 is a flowchart showing a processing procedure of the device driver. Since the controller of the digitizer portion 1 sends to the device driver the input information periodically from the time when the touch panel 3 is initially touched by the finger till the time when the touch panel 3 is not touched, the device driver performs a process of FIG. 4 by interruption every time of receiving the input information. When the touch panel 3 is kept away from the finger, the process of FIG. 4 is not performed.

First of all, at step S41, a determination is made whether or not the finger is kept away from the touch panel 3. When the contact is off in the input information, it is determined that the finger is kept away from the touch panel 3. If it is determined that the finger is kept away from the touch panel 3, an extension mode flag and a flag 1 are reset at step S48, and the data for the initial touched position and the time to be saved at steps S49 and S52 are cleared. Then, the procedure transfers to step S50 to perform an ordinary process. In this case, the ordinary process is ordinarily performed by the conventional device driver for the touch panel, and involves notifying the OS of the same data as that notified to the OS when effecting the left button click, double-click or drag of the mouse.

If it is determined that the touch panel 3 is still touched by the finger at step S41, the procedure goes to step S42 to determine whether or not the extension mode flag is set. The extension mode flag is set at step S46, if an extension mode process (hereinafter referred to as a "second processing") at step S47 that is different from the conventional ordinary process is made. If it is determined that the extension mode flag is set, the procedure transfers to step S47 to make the extension mode process. Thereby, once proceeding from step S46 to step S47 for the extension mode process, the extension mode process is repeatedly performed, so long as the touch panel 3 continues to be touched.

If it is determined that the extension mode flag is not set at step S42, the procedure goes to step S43 to determine whether the touch panel is now touched to start to input a coordinate or continues to be touched. Namely, if the flag 1 indicating that the contact is continued is off, and the contact is on, it is determined that the touch panel is now touched, but if the flag 1 is on, and the contact is on, it is determined that the touch panel continues to be touched. In the case where it is determined that the touch panel is now touched, the flag 1 is set, and the input coordinate indicated by the input information is saved as the initially touched position along with the present time at step S49. Thereafter, the procedure transfers to step S50 to perform the ordinary process.

If it is determined that the touch panel continues to be touched at step S43, the procedure goes to step S44 to determine whether or not the current touched position is near the initial touched position saved at step S49, namely, almost the same position as the initial position. This determination is made depending on whether or not the distance from the input coordinate of initial touched position to the current input coordinate is within 0.5 mm, for example. Even though the operator thinks to touch on the same position, a minute change to this extent may occur. If it is determined that the current touched position is not near the initial touched position, the procedure goes to step S50 to perform the ordinary process.

If it is determined that the current touched position is near the initial touched position at step S44, the procedure goes to step S45 to determine whether or not the lapse time from the initial contact is Dt or more. The lapse time can be obtained from the time saved at step S49 at the initial contact and the present time. If it is determined that the lapse time is shorter than Dt, the procedure transfers to step S50 to perform the ordinary process.

If it is determined at step S45 that the lapse time from the initial contact is Dt or more, the procedure transfers to step S46, where the extension mode flag is set. Then, the procedure goes to step S47. That is, after the input of arbitrary coordinate, its coordinate input is continued as almost the same input coordinate, and if the predetermined time period Dt lapses, the second processing is performed.

In accordance with the above processing procedure, in case of performing an operation of touching arbitrary single point by the forefinger for a short time period before the lapse of time period Dt, the processing through steps S41 to S45 to step S50 is repeated during the input operation. However, when the touch panel is not touched by the forefinger, the processing passes through steps S41 and S48 to step S50. In this case, the ordinary process at step S50 involves reporting the data as reported to the OS when the coordinate at the touched position is clicked by pressing the left mouse button. Thereafter, the process of FIG. 4 is not performed till there is any touch again to cause an interruption.

On the other hand, in case of performing an operation of touching arbitrary single point by the forefinger for a time period Dt or more, the processing through steps S41 to S45 to step S50 is repeated, until the time period Dt is reached. However, when the time period Dt is reached, the processing passes through steps S41 to S46 to step S47 for the extension mode process. Thereafter, the procedure through steps S41 and S42 to step S47 is repeated to make the extension mode process, so long as touching any position is continued. If the touch panel 3 is not touched, the extension mode process is ended, and the device driver operation is ended by passing through the steps S41, S48 and S50. Thereafter, the process of FIG. 4 is not performed till the contact is made again to cause an interruption.

Accordingly, in the process of FIG. 4, by performing a simple operation of touching a desired point for the time period Dt or more, the operator can appropriately select and perform the operation equivalent to the left button click of mouse or the extension mode process.

Figure 5:
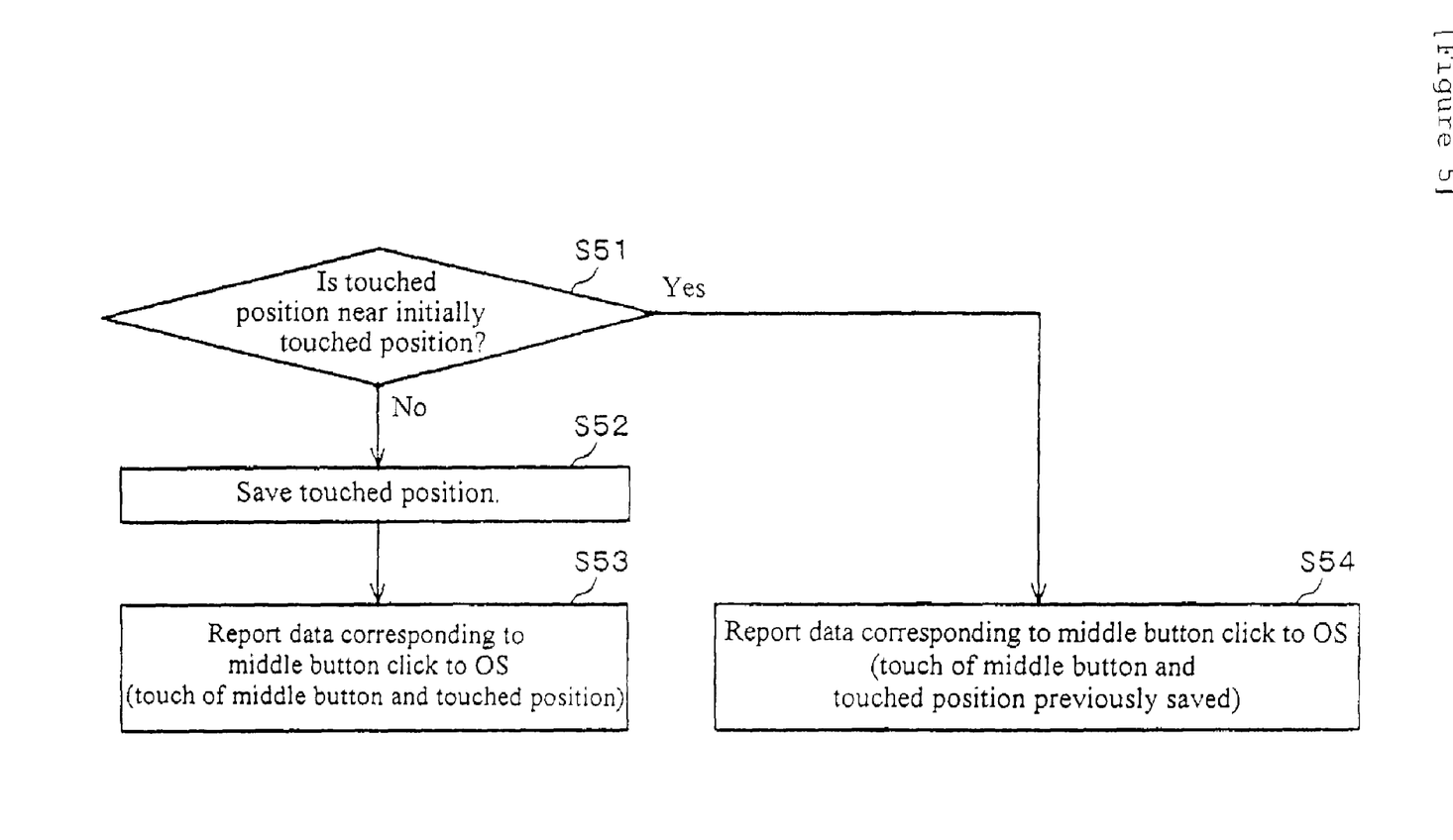
FIG. 5 is a flowchart showing a processing procedure of scrolling a display area within a window as one example of an extended mode process at step S47 in FIG. 4.

FIG. 5 is a flowchart showing a processing procedure for scrolling a display area within the window displayed on the display screen as one example of the extension mode process at step S47. If the procedure is started, first of all, a determination is made at step S51 whether or not the touched position at present is near the initially touched position saved at step S49. This determination is made depending on whether or not the distance from the initially touched position to the touched position at present is within 0.5 mm. By being not near the initially touched position, it is meant that because another new point is touched, the input coordinate is greatly changed to the middle point between the touched positions, or the touched position is shifted from the initially touched position. If it is determined that the touched position at present is not near the initially touched position, the procedure goes to step S52 to save the current input coordinate as the touched position at present. Then, at step S53, the data corresponding to the data as notified to the OS when making the middle button click of the mouse is reported to the OS. This data includes the data indicating that the middle button is pressed and the data indicating the touched position (input coordinate) at present.

If it is determined at step S51 that the touched position at present is near the initially touched position, the procedure goes to step S54 to report to the OS the data corresponding to the data as notified to the OS when making the middle button click of the mouse. In this case, the reported data includes the data indicating that the middle button is pressed and the data indicating the touched position (input coordinate) saved at step S52. If step S52 is not passed once, the touched position saved at step S49 in FIG. 4 is employed.

While being continuously reported at steps S53 and S54 in the process of FIG. 5, the OS scrolls up or down, and left or right the form in accordance with the distance and direction from the previously touched position, based on the touched position reported successively. Accordingly, the variation of image is not ceased while the touched position is being changed, whereby the operator can get the information from the display screen efficiently in accordance with one's will.

Figure 6:
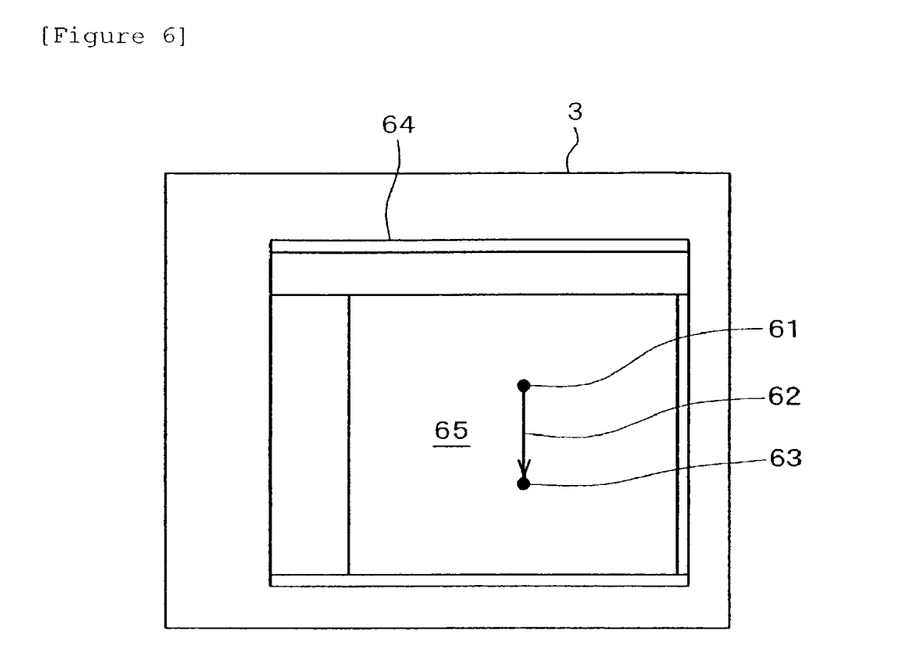
FIG. 6 is a view for explaining an operation of scrolling the display area by one finger, for example, a forefinger, in the process of FIG. 5.

FIG. 6 is a view for explaining a scroll operation of scrolling the display area by one finger, for example, a forefinger. In this case, the extension mode is made effective by touching arbitrary position 61 on the touch panel 3 for a time period Dt or more, and then a display area 65 within a window 64 displayed on the display screen can be scrolled by sliding the forefinger from the touched position 61 up to arbitrary position 63 in a scroll direction 62 as shown in FIG. 6. After transferring to the extension mode process, the processing at step S54 is repeated while the touched position by the forefinger remains near the position 61. However, if the forefinger is slid from the touched position 61, it is detected that the touched position is not near the initially touched position at step S51, and then the steps S52 and S53 are repeated till the touch panel 3 is not touched at position 63 by the forefinger. In this case, the forefinger is kept away from the touch panel 3 by sliding the forefinger at a time, whereby the extension mode process is ended in accordance with the determination at step S41 in FIG. 4. The direction for sliding the finger may be up or down, and left or right, whereby the display area is scrolled in the corresponding direction.

Figure 7:
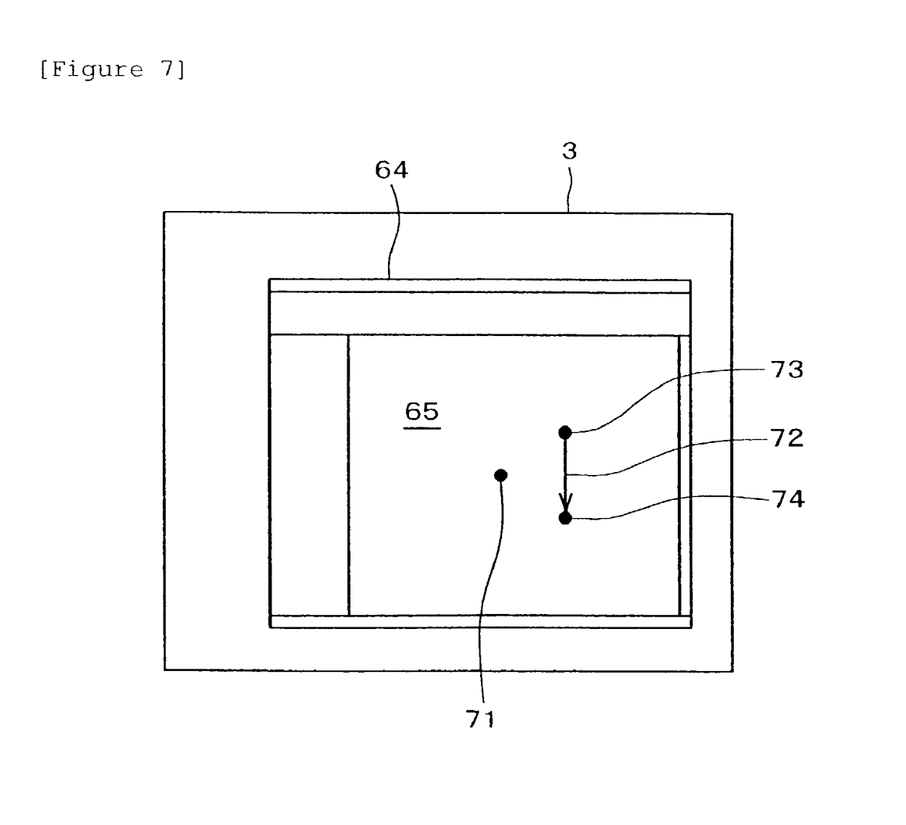
FIG. 7 is a view for explaining the operation of scrolling the display area by two fingers, for example, a forefinger and a middle finger, in the process of FIG. 5.

FIG. 7 is a view for explaining a scroll operation of scrolling the display area by two fingers, for example, a forefinger and a middle finger. In this case, the extension mode is entered by touching arbitrary position 71 on the touch panel 3 by the forefinger for a time period Dt or more, and then the middle finger is slid from arbitrary position 73 up to arbitrary position 74 in a scroll direction 72, while the position 71 is touched by the forefinger, as shown in FIG. 7. Thereby, the display area 65 within the window 64 can be scrolled in the direction 72. If the middle finger is repeatedly slid while the forefinger touches the position 71, the display area 65 can be scrolled many times continuously. After transferring to the extension mode process, the processing at step S54 is repeated until the position is touched by the middle finger. However, if the position is touched by the middle finger, the input coordinate is greatly changed to the middle point between the touched position 71 by the forefinger and the touched position 73 by the middle finger. This middle position is detected at step S51, and the steps S52 and S53 are repeated until the position 74 is not touched by the middle finger. If the middle finger is kept away from the position 74, the input coordinate is the touched position by the forefinger again, whereby the processing at step S54 is repeated until the middle finger is slid for scrolling again. In this manner, the steps S41, S42 and S47 in FIG. 4 are repeated in the extension mode while the touch by the forefinger is continued, whereby the display area is scrolled correspondingly by sliding the middle finger repeatedly. In this case, the direction for sliding the middle finger may be up or down, and left or right, whereby the display area is scrolled in the corresponding direction.

Another example of the extension mode is a processing for making an magnifying glass. This processing is implemented by using the API (Application Program Interface) provided for the OS, for example, stretch build (StretchBlt) provided for the Windows 98 or Windows Me. In this API, it is required to preset the parameters including the position, width and height of an enlarged object area, and the position, width and height of an enlarged display area. If these parameters are given to the API at step S47 as they are variable in accordance with the change in the touched position, the magnifying glass with the positions of the enlarged object area and the enlarged display area changing in succession can be made in correspondence to the movement of the touched position.

Figure 8:
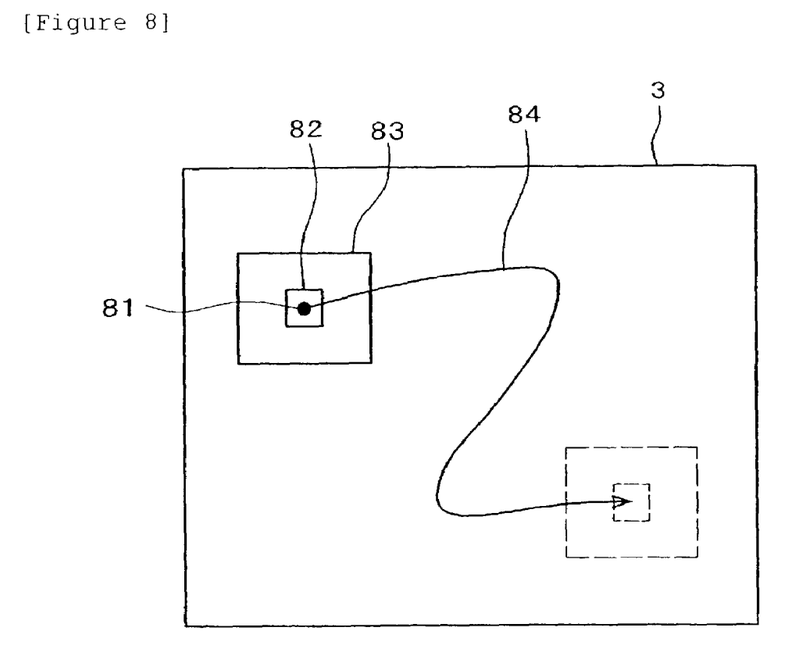
FIG. 8 is a view for explaining the operation for performing an magnifying glass as another example of an extended mode process in FIG. 4.

FIG. 8 is a view for explaining an operation for making the magnifying glass. As shown in FIG. 8, if the extension mode is entered by touching arbitrary position 81 on the touch panel 3 by the forefinger for a time period Dt or more, an area 82 on the screen corresponding to the position 81 is expanded to an area 83. Then, the magnifying glass that is varied in real time corresponding to the transition of touched position by the forefinger can be effected by sliding the forefinger in a direction for making the magnifying glass in succession, for example, along the line 84. That is, after transferring to the extension mode, the input coordinate is changed periodically from substantially the same input coordinate as that at the initial input of arbitrary coordinate by the forefinger, and the area 82 having a certain positional relation with the periodically changed input coordinate is expanded in which the display area 83 is successively moved following the periodically changed input coordinate. If the forefinger is released, the magnifying glass is ended upon the determination at step S41, and the process of FIG. 4 is not performed until the touch panel 3 is touched again.

As described above, in this embodiment, the extension mode process (second processing) can be made by a simple operation of keeping the touch on arbitrary position on the touch panel 3 for a time period Dt. In the extension mode process, the display on the screen is changed in real time in moving the touched position while keeping the touch on the touch panel 3, whereby the operator feels like the operation coincides with a change in the display on the screen, and acquires efficiently the information on the display screen. In the extension mode process, the scroll operation or magnifying glass may be preset or changed by the operator.

The invention is not limited to the above embodiment, but may be appropriately modified. For example, the pointer display is not mentioned in the above, but in the extension mode process, the pointer for allowing the extension mode to be recognized may be displayed. For example, when the scroll is made, the pointer may be a scroll pointer including the arrow indicating the scroll direction, while when the magnifying glass is made, the point may be a zoom pointer having the shape of a magnifying glass. The display of the pointer for the extension mode is initiated at a timing when an extension mode flag at step S46 in FIG. 4 is set, whereby the operator easily recognizes a transition to the extension mode to start the operation such as scroll. The display position of pointer for the extension mode may be the current touched position, or the touched position at the initial time of the touch, for example. When the scroll is made by two fingers, the display position of the scroll pointer in keeping the sliding finger away is the touched position saved at step S52, whereby it is possible to prevent the unnatural movement of the pointer in keeping the sliding finger away. After the end of the extension mode process, the normal pointer display is restored.

In the above magnifying glass, the positional relation between the touch position by the finger and the enlarged display area 83 is not specifically mentioned, but the touched position may be at the end portion or outside of the enlarged display area 83 to prevent the enlarged display area 83 from being concealed by the operator's hands.

In the above embodiment, the touch panel 3 for entering the middle point of those two points when touched at the same time is employed, but instead, the touch panel 3 for entering the coordinate of each of two points when touched at the same time may be used. In this case, it is necessary to additionally have a process for converting two coordinates to be input when two points are touched into the coordinate of one point that is the middle point of two points.

In the above embodiment, the touch panel 3 is pressure sensitive, but alternatively may be of other methods including digital (matrix) method, optical (infrared) scan method, capacitive coupling method, and surface acoustic wave method.

Figure 9:
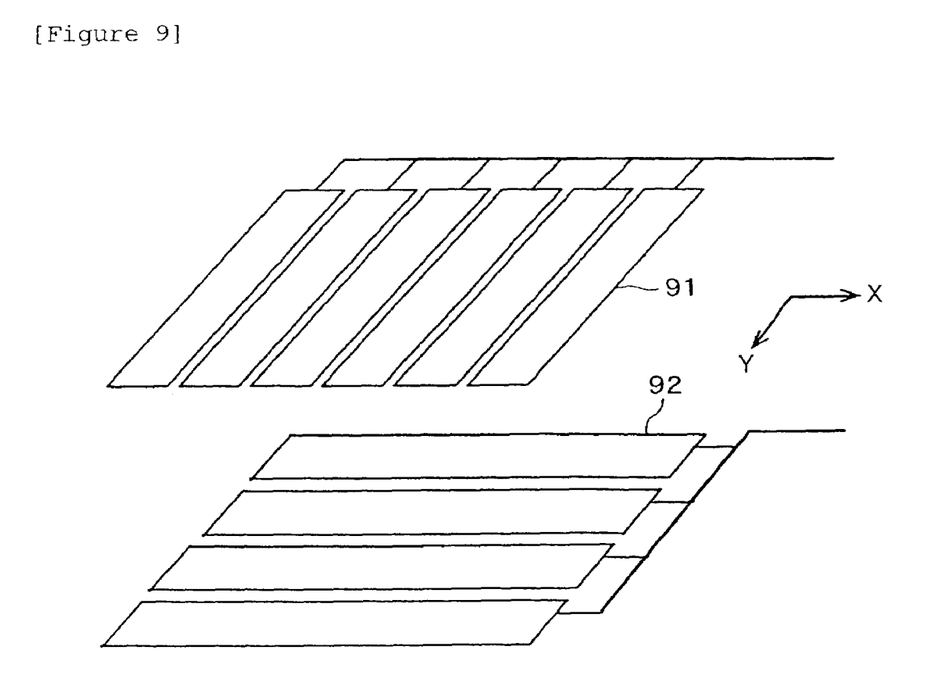
FIG. 9 is a view for explaining a principle of a touch panel of digital (matrix) system.

The touch panel of the digital (matrix) method has a plurality of strip transparent electrodes 91 and a plurality of strip transparent electrodes 92 arranged in the X and Y directions, respectively, as shown in FIG. 9. The transparent electrodes 91 and 92 are opposed via a void, and if a position is touched, any transparent electrodes 91 and 92 corresponding to its position conduct. The touched position can be detected by sequentially scanning the transparent electrodes 91 and 92 to examine which transparent electrodes 91 and 92 conduct. The resolution of the touched point depends on the number of transparent electrodes 91 and 92, and is lower than with the pressure sensitive method. Theoretically, a plurality of touched positions can be detected at the same time, but the number of positions detectable at the same time depends on the specification of the controller in use. The calibration is unnecessary.

Figure 10:
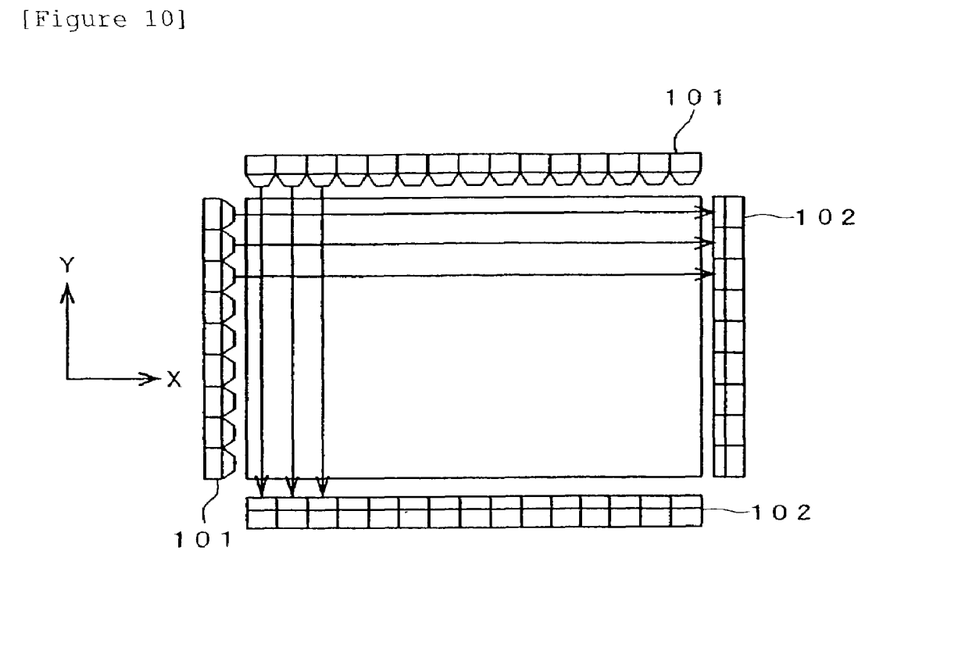
FIG. 10 is a view for explaining a principle of a touch panel of optical (infrared) scan system.

The touch panel of optical (infrared) scan method has a number of light emitters 101 and light sensors 102 in pairs arranged in the X and Y directions, respectively, as shown in FIG. 10. The light sensors 102 detect the position at which a light emitted from the light emitters 101 is intercepted by the finger or pen, whereby the touched position by the finger or pen is detected, and output. The resolution of the touched point depends on the number of light emitters 101 and light sensors 102, and is lower than with the pressure sensitive method. Theoretically, a plurality of touched positions can be detected at the same time, but usually, the first touched position is only detected. The number of positions detectable at the same time depends on the specification of the controller in use. The calibration is unnecessary. The operation is not affected by a flaw on the surface of the panel.

The touch panel of capacitive coupling method has a structure in which a conductive film is formed on the surface of the panel, and electrodes are arranged peripherally. If a uniform electric field is produced on the conductive film from the peripheral electrodes, a current flows to disorder the electric field, when a finger or a special pen touches the panel surface. The touch position can be calculated in accordance with this current. This touch panel has a high transparency of panel and a high resolution, but when two points are touched at the same time, their middle point is recognized as the touched point. With this method, since there is no need for deforming the electrode to make contact to recognize the touched point, unlike the pressure sensitive or digital method, there is less force for touching the panel, and the touched point can be recognized only by touching slightly the surface. To flow a current through the surface, the use of a special pen is demanded. When the panel is touched, it is necessary to use a bare finger.

Figure 11:
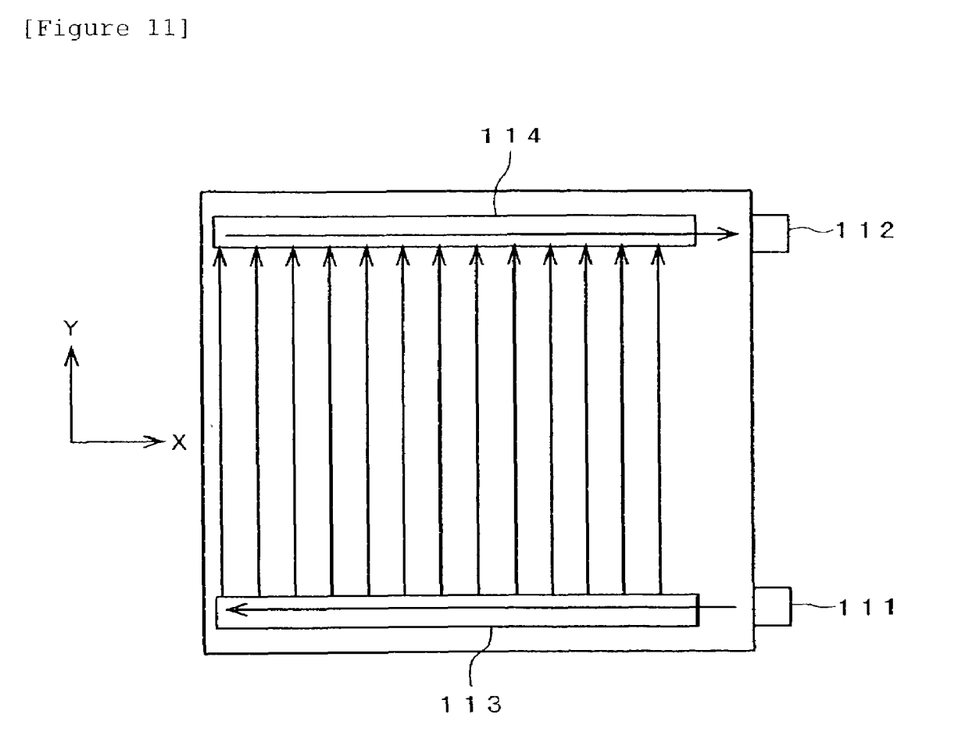
FIG. 11 is a view for explaining a principle of a touch panel of surface acoustic wave system.

The touch panel of surface acoustic wave method comprises a ultrasonic (surface acoustic wave) oscillator 111 and a receiver 112, a reflection array 113 for reflecting the ultrasonic wave emitted by the oscillator 111, and a reflection array 114 for reflecting the ultrasonic wave reflected from the reflection array 113 toward the receiver 112, as shown in FIG. 11. In FIG. 11, a component for detecting the touched position in the X-direction is illustrated, but the component may be rotated 90 degrees for detecting the touched position in the Y-direction. The ultrasonic wave emitted from the oscillator 111 is reflected in the Y or X direction by the reflection array 113, travels along the panel surface, reflected by the reflection array 114, and received by the receiver 112, but because the distance of transmission path is different depending on the reflection position of the reflection array 113, 114, the ultrasonic wave arrives at the receiver 112 with a certain temporal breadth. At this time, the ultrasonic wave travels uniformly over the entire surface of the panel in a non-touched state, whereby the strength of ultrasonic wave incident upon the receiver 112 is constant over time. However, if there is any touched point by the pen or finger halfway, the transmission of ultrasonic wave through that position is delayed, so that the receiving strength at the time corresponding to that position is lowered. Accordingly, the controller for the touch panel can calculate the coordinate of touched position in accordance with the time when the receiving strength is lowered. This touch panel has a high transparency of the panel and a high resolution of the input coordinate. Furthermore, this touch panel allows a plurality of coordinates to be input at the same time. However, usually, the coordinate input of the firstly touched position is only accepted. The number of positions that can be input at the same time depends on the specification of the controller. A special pen having a high absorptivity of ultrasonic wave is required for input.

Figure 12:
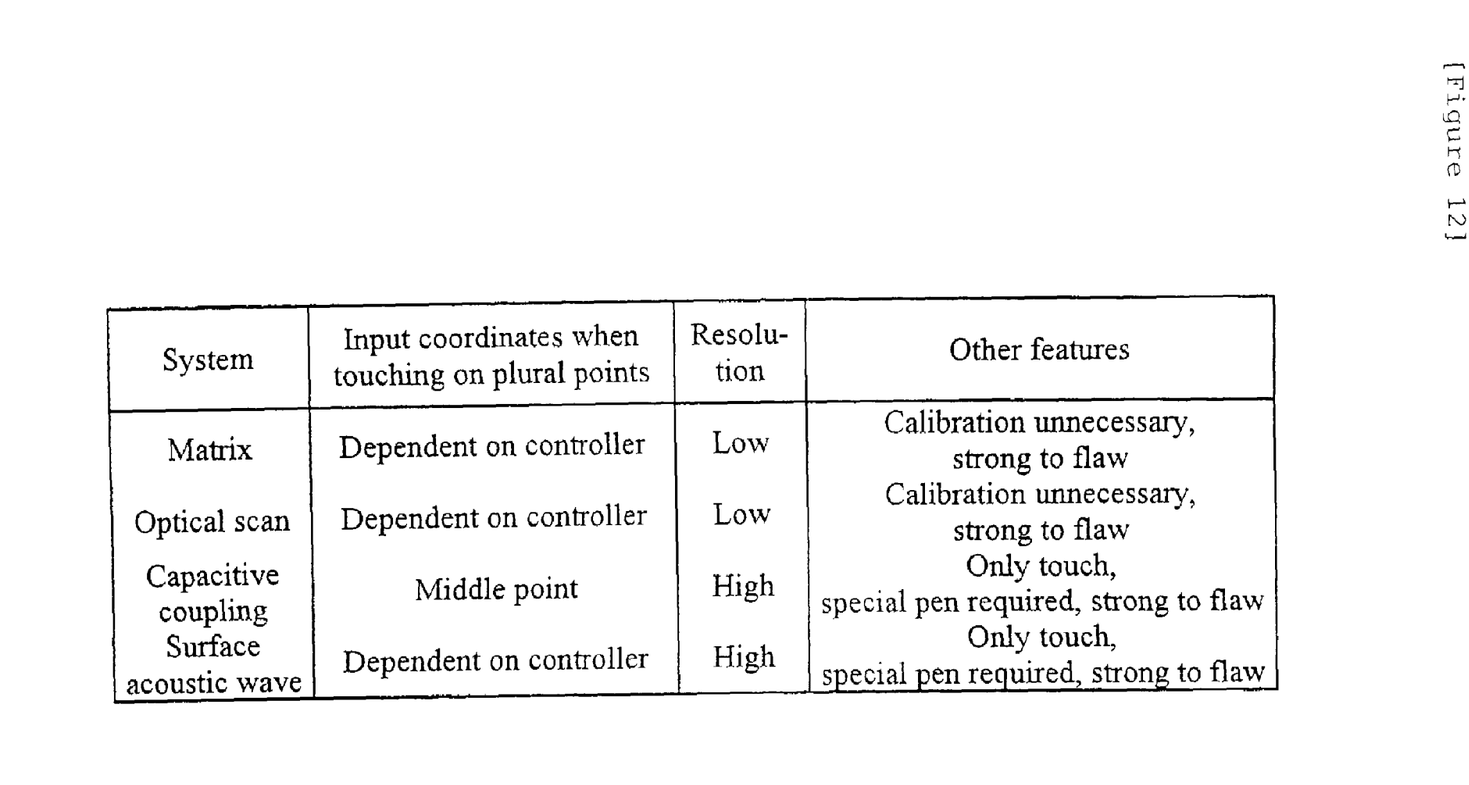
FIG. 12 is a table listing features of the touch panel of each system that is usable in this invention.

Each method of the touch panel has the features as listed in table 12.

In the drawings and specifications there has been set forth a preferred embodiment of the invention and, although specific terms are used, the description thus given uses terminology in a generic and descriptive sense only and not for purposes of limitation.

What is claimed is:

1. An information processing apparatus comprising:
   a touch panel operable to display an image;
   a coordinate input unit for periodically receiving input coordinates corresponding to a touched position on the touch panel;
   a unit for determining whether or not the periodically received input coordinates are substantially the same and a predetermined time period has lapsed from an initial contact with the touch panel;
   a first processing unit for performing a first processing on the image when the determination is not met, the first processing including two or more of processing equivalent to a left-button click of a mouse on the image, a double-click of a mouse on the image, or a drag of a mouse on the image; and
   a second processing unit for preferring a second processing on the image when the determination is met, the second processing being different from any of the processing associated with the first processing.

2. The information processing apparatus according to claim 1, wherein the second processing comprises scrolling the image in a direction corresponding to a periodic change in input coordinates of the touched position.

3. The information processing apparatus according to claim 2, wherein a scroll pointer is displayed on the touch panel during the second processing, the scroll pointer including an arrow indicating the direction of the periodic change in input coordinates of the touched position.

4. The information processing apparatus according to claim 1, wherein the second processing comprises scrolling the image in a direction corresponding to a periodic change in input coordinates of a second touched position on the touch panel.

5. An information processing apparatus comprising:
   a touch panel operable to display an image;
   a coordinate input unit for periodically receiving input coordinates corresponding to a touched position on the touch panel;
   a unit for determining whether or not the periodically received input coordinates are substantially the same and a predetermined time period has lapsed from an initial contact with the touch panel;
   a first processing unit for performing a first processing on the image when the determination is not met, the first processing including two or more of processing equivalent to a left-button click of a mouse on the image, a double-click of a mouse on the image, or drag of a mouse on the image; and
   a second processing unit for performing a second processing on the image when the determination is met, the second processing being different from any processing associated with the first processing, wherein the second processing comprises displaying the image in greater scale corresponding to a periodic change in input coordinates of the touched position.

6. The information processing apparatus according to claim 5, wherein the periodic change in input coordinates of the touched position is always located at an end portion or outside of a display area on the touch panel.

7. A program tangibly stored on a computer-readable medium for enabling a computer to:
   display an image on a touch panel;
   periodically receive input of a coordinates corresponding to a touched position on the touch panel;
   determine whether or not the periodically received input coordinates are substantially the same and a predetermined time period has lapsed from an initial contact with the touch panel;
   perform a first processing on the image when the determination is not met, the first processing including two or more of processing equivalent to a left-button click of a mouse on the image, a double-click of a mouse on the image, or a drag of a mouse on the image; and perform a second processing on the image when the determination is met, the second processing being different from any of the processing associated with the first processing.

8. The program according to claim 7, wherein the second processing comprises scrolling the image in a direction corresponding to a periodic change in input coordinates of the touched position.

9. The program according to claim 8, further enabling the computer to display a scroll pointer on the touch panel during the second processing, the scroll pointer including an arrow indicating the direction of the periodic change in input coordinates of the touched position.

10. The program according to claim 7, wherein the second processing comprises scrolling the image in a direction corresponding to a periodic change in input coordinates of a second touched position on the touch panel.

11. A program tangibly stored on a computer-readable medium for enabling a computer to:

display an image on a touch panel;

periodically receive input of a coordinates corresponding to a touched position on the touch panel;

determine whether or not the periodically received input coordinates are substantially the same and a predetermined time period has lapsed from an initial contact with the touch panel;

perform a first processing on the image when the determination is not met, the first processing including two or more of processing equivalent to a left-button click of a mouse on the image, a double-click of a mouse on the image, or drag of a mouse on the image; and perform a second processing on the image when the determination is met, the second processing being different from any of the processing associated with the first processing, wherein the second processing comprises displaying the image in greater scale corresponding to a periodic change in input coordinates of the touched position.

12. The program according to claim 11, wherein the periodic change in input coordinates of the touched position is always located at an end portion or outside of a display area on the touch panel.

13. A method for performing input processing on a touch panel, the method comprising:

displaying an image on the touch panel;

performing a first processing on the image if a received user input location on the touch panel remains unchanged for less than a pre-determined time, the first processing including two or more of processing equivalent to a left-button click of a mouse on the image, a double-click of a mouse on the image or drag of a mouse on the image;

a second processing on the image if the received user input location on the touch panel remains unchanged for longer than the pre-determined time, the second processing being different from any of the processing associated with the first processing.

14. The method according to claim 13, wherein the second processing comprises scrolling the image in a direction corresponding to a periodic chance in the received user input location on the touch panel.

15. The method according to claim 14, wherein a scroll pointer is displayed on the touch panel during the second processing, the scroll pointer including an arrow indicating the direction of the periodic change in the received user input location on the touch panel.

16. The method according to claim 13, wherein the second processing comprises scrolling the image in a direction corresponding to a periodic change in input coordinates of a second received user input location on the touch panel.

17. A method for performing input processing on a touch panel, the method comprising:

displaying an image on the touch panel;

performing a first processing on the image if a received user input location on the touch panel remains unchanged for less than a pre-determined time, the first processing including two or more of processing equivalent to a left-button click of a mouse on the image, a double-click of a mouse on the image, or drag of a mouse on the image;

a second processing on the image if the received user input location on the touch panel remains unchanged for longer than the pre-determined time, the second processing being different from any of the processing associated with the first processing, wherein the second processing comprises displaying the image in greater scale corresponding to a periodic change in the received user input location on the touch panel.

18. The method according to claim 17, the periodic change in the received user input location on the touch panel is always located at an end portion or outside of a display area on the touch panel.

* * * * *